April 24, 1951  K. E. EVRELL  2,549,897
PRESSURE OPERATED VALVE MEANS FOR HYDROSTATIC
POWER TRANSMITTING SYSTEMS
Filed Aug. 1, 1947

Inventor
Ralph Emil Evrell
By [signature]
his attorney

Patented Apr. 24, 1951

2,549,897

UNITED STATES PATENT OFFICE 2,549,897

PRESSURE OPERATED VALVE MEANS FOR HYDROSTATIC POWER TRANSMITTING SYSTEMS

Kaleb Emil Evrell, Eskilstuna, Sweden, assignor to Aktiebolaget Bolinder-Munktell, Eskilstuna, Sweden, a corporation of Sweden Application August 1, 1947, Serial No. 765,607
In Sweden October 18, 1945

3 Claims. (Cl. 137—153)

1

Hydrostatic power transmission means generally operate on the principle of adjusting an operating member in a manner such that liquid is conveyed under superatmospheric pressure to a working motor performing the desired work, whereupon the movement of the motor ceases. If the desired effect is such that a liquid pressure should prevail in the system even when no movement takes place (for instance in hydraulically operating riveting machines, presses, road planers, log carriages for sawing mill machines, power station regulators and so forth), then either a pump is made use of, which is adapted to adjust its capacity to the demand, or, in a pump having a constant output, the excess is conveyed to an accumulator or over an overflow valve back to the liquid container, which is generally relieved of pressure. The adjustment of the operating member is effected either manually or mechanically, in the latter case in a number of different ways, for instance by means of a centrifugal governor fitted with a return contrivance. In most cases, the demand for pressure liquid is such that in the time where no shifting takes place only a rather immaterial quantity is required to compensate for the leakage in motors, operating members and the like, whereas, when work is being performed, a multiplied quantity is frequently required.

A pump having a variable output volume may be caused to adapt the supplied quantity of liquid in accordance with the demand, but the pump proper and the device varying the capacity thereof become of a complicated construction. The storing of work with an accumulator is also a tedious task and is used, as a rule, only in large stationary plants.

To avoid expensive and complicated constructions, one generally resorts to the means of dimensioning the pump for the quantity consumed in the work desired, whereas during the time wherein no work is performed all of the oil not consumed for the compensation of leakage is caused to flow back to the oil receptacle over a spring-loaded overflow valve. This involves a waste of work, and by the fact that the work is transformed into heat the risk is incurred that such augmentations of the temperature will occur that the viscosity of the compressed oil falls to values where the leakage becomes too great. Generally, only a reasonable waste of work can be tolerated, the designer being consequently compelled to restrict the output of the desired performance, that is to say, the useful work performed per unit of time, to lower values than would be suitable, if selection were free.

The maximum quantity required in the most unfavorable cases for compensating leakage may be established. Likewise, the increase of capacity required to attain the desired operating speed of the motor is known. The invention aims, in starting from this point, at providing a method of hydraulic transmission, where the above described drawbacks are eliminated, which is generally attained by the fact that the liquid is supplied to the working motor during its working period from two pumps, one of the pumps being relieved, however, when a certain pressure of the liquid is exceeded, while the other pump is still supplying compressed liquid. An arrangement particularly suited for carrying the method into effect is distinguished by the fact that the pressure sides of two pumps are connected through conduits with a working motor, such as a reciprocating motor, said conduits having provided therein a shifting member or relay adapted to open the connection between the pressure side of one of the pumps and the return conduit, when a certain pressure is reached in the working motor, in order to reduce the power consumption in this pump.

According to the invention, the arrangement may supply a minimum quantity continuously, and may automatically augment such quantity to the larger quantity required in shifting, as soon as a shift is called for, which quantity is likewise fully determined.

The pump intended to compensate for the maximum leakage at a good margin is preferably of a smaller capacity, whereas the larger pump is dimensioned for the capacity required at an increased performance of work. It may be found suitable, in certain cases, to make the smaller pump as a high pressure pump, whereas the larger pump is intended for a lower pressure and facilitates rapid displacements of the movable part of the working motor while overcoming a resistance lower than that of the ultimate working pressure.

Figure 1:
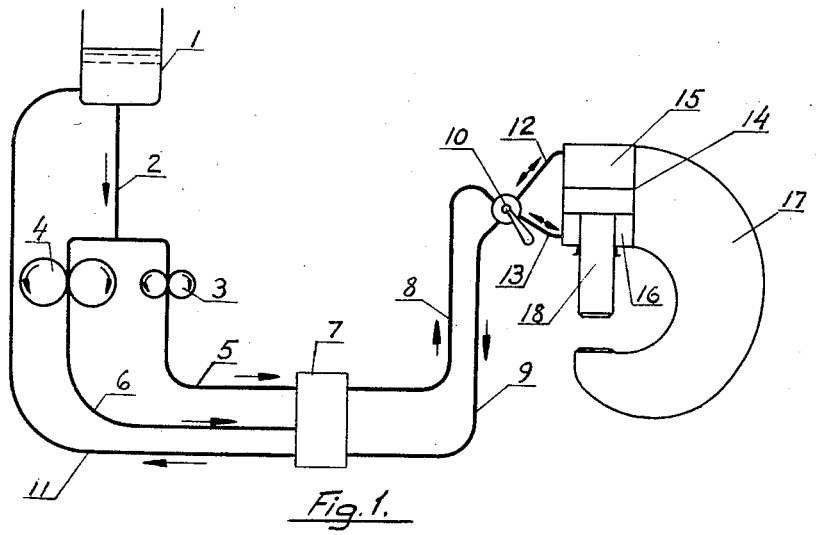
Fig. 1 is a diagrammatic illustration of an arrangement devised in accordance with the invention.

From a collecting receptacle 1, oil flows by itself through a conduit 2 to the two pumps 3 and 4. These pumps, which are preferably of the rotary displacement type, are preferably built into a unit having a common supply and separate outlets. The pumps deliver oil through the conduits 5 and 6 connected to a relay 7, which latter is connected, through a pressure conduit 8 and a return conduit 9, to a control member 10. Furthermore, the relay is connected with the receptacle 1 through a return conduit 11. Extending from the control member 10 to the hydraulic motor are conduits 12 and 13, said motor comprising, in the example shown, a working cylinder 14 on a hydraulic press 17. Provided in the working cylinder is a differential piston 18. In this case, the control member 10 is constituted by a valve having three different positions of adjustment. In one position, called the first position hereafter, the oil conduits 8 and 12 are brought into communication with each other, which is also the case with the conduits 9 and 13. Compressed oil flows to the space 15 above the differential piston 18, which moves downwardly and displaces the oil in the space 16 underneath the piston through the conduits 13, 9 and 11. In another position of the control member, the conduits 8 and 13 and 9 and 12, respectively, are brought into communication with each other, the differential piston having thus an upward movement imparted thereto. In the third position of the control member, the conduits 8 and 9 are brought into mutual communication, whereas the conduits 12 and 13 are entirely closed. Now, the piston 18 stands still, the oil coming through the pipe 8 being thus permitted to flow freely back through the pipe 9. The work of the compressed oil and the method of directing the same may be varied in a multiplicity of ways, which may be known per se and which, consequently, do not interfere with the principle of the invention.

Figures 2, 3, 4:
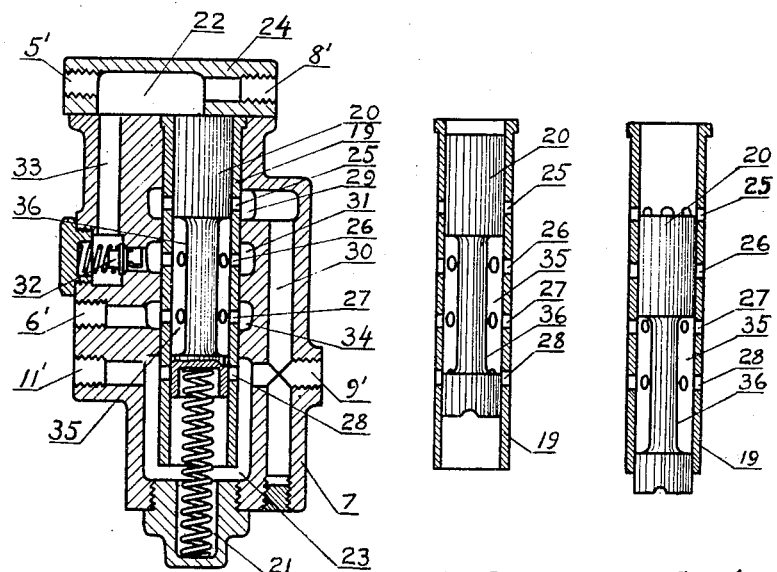
Fig. 2 shows a section through a relay pertaining to the arrangement.
Figs. 3 and 4 show a slide or piston comprised in the relay and taking two other positions relatively to a fixed part of the relay.

In Fig. 2, the connections of the pipes 5, 6, 8, 9 and 11 are indicated by 5', 6', 8', 9', and 11', respectively. It will appear from the figure that the pipes 5 and 8 are always in free communication with one another over a passage or a space 22, such being also the case with the pipes 9 and 11 over a passage or space 23. The directing member of the relay is an easily movable slide 20 within a lining 19. The slide is actuated by a compression spring 21 in the one direction and, in the other direction, by the difference in the oil pressure between the spaces 22 and 23. The space 23 is in constant connection, through pipe 11, with the oil receptacle 1 relieved of pressure, and consequently only a slight pressure above atmospheric prevails in the latter space. The slide lining 19 has four mutually and axially staggered series of ports 25, 26, 27 and 28. The ports 28 open into the space 23 and the ports 25 into an annular channel 29, which is likewise in communication with the space 23 through a passage 30. An annular channel 31 having the ports 26 opening into the same communicates with the space 22 over the lightly spring-loaded check valve 32 and a passage 33. The ports 27 open into an annular channel 34 connected with the pipe connection 6'. The valve 32 is so arranged as to permit flow of oil, without any appreciable resistance, from the channel 31 to the space 22, while preventing altogether a flow in the opposite direction.

As soon as the effect of the oil pressure on the upper side of the slide 20 exceeds the force erected by the spring 21, the slide is caused to move downwardly. If it be now assumed that the oil pressure corresponding to the position of the slide shown in Fig. 3 is $p_2$ and that the oil pressure corresponding to the position in Fig. 4 is $p_3$, then $p_3$ must be greater than $p_2$, inasmuch as the spring force increases with an increasing compression. A still lower oil pressure $p_1$ is taken to correspond to the slide position shown in Fig. 2.

In the previously described third position of the control member 10, where the pipes 8 and 9 are in direct communication with each other, the passage 5, 22, 8 only has a pressure prevailing therein which corresponds to the resistance to the flow, it being assumed that the relay has been proportioned so that $p_1$ is greater than said pressure. Thus the space 22 has a pressure prevailing therein which falls below $p_1$, the slide 20 consequently bearing against the lower side of an element 24 connected with the relay housing, as shown in Fig. 2. The oil coming from both pumps 3, 4 then flows through the pipes 8, 9 and 11. The oil coming from the pump 3 passes directly through the space 22 of the relay to the pipe 8, and the oil from pump 4 flows through the ports 27, 26 and the channels 31 and 33 to the space 22 and thence through the pipe 8. If the control member 10 is now shifted to the first position as per above, the relay slide 20 still stands in the position shown in Fig. 2. On the condition that the resistance to the movement of the working piston 18 is no greater but that an oil pressure less than or equal to $p_1$ can overcome the same. When the piston 18 meets a greater resistance, for instance by being caused to compress a mass in a Bakelite mould, the pressure is augmented and at a certain moment reaches the value $p_2$, the lower part of the slide 20 then commencing to uncover the ports 28, so that direct communication is established between the conduits 6 and 11 over the passage 34, the ports 27, the space 35, the ports 28, and the space 23. The pump 4 now begins to become relieved. At the same time, the piston 18 may in this position have performed a greater or smaller portion of its effective pressing stroke. Finally, when the liquid pressure has reached the value $p_3$, the slide 20 takes the position shown in Fig. 4. Now the whole oil stream is directed from the pump 4 back to the oil receptacle 1 over the short-circuiting passage just mentioned. It will be understood that this return flow takes place without any appreciable pressure losses, the pump 4 becoming consequently relieved. All that oil flowing to the space 22 from the pump 3 which is not consumed to replace the oil leaking past the piston, the slide and so forth passes through the ports 25 and then reaches the space 23 through the passages 29 and 30, from which space it returns to the oil receptacle 1 through pipe 11. It is true that a fall of the pressure on the oil takes place here at the passage through the ports 25, but since only small quantities of oil are brought into consideration here, the loss in output involved thereby will be of no practical consequence.

In the slide position shown in Fig. 3, or in adjacent positions of the slide, compressed oil delivered from the pump 3 might be drained off to the return conduit 11, if the valve 32 did not exist and prevented such a flow. Inasmuch as the magnitude of the pressures $p_1$, $p_2$ and $p_3$ and the relations between them may be varied constructively between wide limits by varying the location of the ports of the slide lining and by varying the spring constant, the invention offers facilities for entirely overcoming the difficulties described in the preamble relative to the consumption of energy in the known constructions.

While one more or less specific embodiment of the invention has been shown, it is to be understood that this is for purpose of illustration only, and the invention is not to be limited thereby, but its scope is to be determined by the appended claims. Thus, more than two pumps may be made use of in certain cases, one or more of such pumps being arranged to be relieved according to the above.

What I claim is:

1. A relay valve comprising a body, a pair of pressure inlets to said body, a pressure outlet in said body, a return line outlet in said body, a cylinder in said body, a plurality of ports in the wall of said cylinder, a plurality of passages in said body communicating with said portions, a piston valve slidably disposed in said cylinder, calibrated spring means constructed and arranged to bias said piston toward one extreme position at one end of said cylinder whereby with said piston in said one extreme position fluid from both pressure inlets will flow to said pressure outlet until the pressure of said fluid reaches a value sufficient to move said piston to an intermediate position against the force exerted by said spring, at which time fluid from one pressure inlet will flow to said pressure outlet, the fluid from the other pressure inlet flowing to said return line and whereby upon the pressure of said fluid reaching a value sufficient to move said piston to the opposite extreme position the fluid from both pressure inlets will flow to said return line.

2. An automatic pressure operated relay valve comprising a body, a plurality of fluid pressure inlets in said body, a fluid pressure outlet in said body, a fluid return line connection in said body, a cylinder in said body, a plurality of ports in the wall of said cylinder, passages in said body communicating with said ports, a piston valve slidably disposed in said cylinder, means biasing said valve toward one extreme position at one end of said cylinder whereby with said piston in said one extreme position fluid from both pressure inlets will flow to said pressure outlet until the pressure of said fluid reaches a value sufficient to move said piston to an intermediate position against the force exerted by said biasing means at which time fluid from one pressure inlet will flow to said pressure outlet, the fluid from the other pressure inlet flowing to said return line and whereby upon the pressure of said fluid reaching a value sufficient to move said piston to the opposite extreme position the fluid from both pressure inlets will flow to said return line.

3. An automatic pressure operated relay valve comprising a body, a plurality of fluid pressure inlets in said body, a fluid return line connection in said body, a bore in said body, a plurality of ports in the wall of said bore, passages in said body communicating with said ports, a valve slidably disposed in said bore, means biasing said valve toward one extreme position at one end of said bore whereby with said valve in said one extreme position fluid from both pressure inlets will flow to said pressure outlet until the pressure of said fluid reaches a value sufficient to move said valve to an intermediate position against the force exerted by said biasing means at which time fluid from one pressure inlet will flow to said pressure outlet, the fluid from the other pressure inlet flowing to said return line and whereby upon the pressure of said fluid reaching a value sufficient to move said valve to the opposite extreme position the fluid from both pressure inlets will flow to said return line.

KALEB EMIL EVRELL.

REFERENCES CITED

The following references are of record in the file of this patent:

UNITED STATES PATENTS

| Number | Name | Date |
| --- | --- | --- |
| 1,382,315 | Philippi | June 21, 1921 |
| 1,982,711 | Vickers | Dec. 4, 1934 |
| 2,365,282 | Lester | Dec. 19, 1944 |